United States Patent [19]

Galahad

[11] Patent Number: 4,493,225
[45] Date of Patent: Jan. 15, 1985

[54] NECK-STRAIN ALLEVIATOR FOR BICYCLISTS

[75] Inventor: Giles Galahad, Denver, Colo.

[73] Assignee: Chaldar, Inc., Denver, Colo.

[21] Appl. No.: 430,876

[22] Filed: Sep. 30, 1982

[51] Int. Cl.³ .............................................. B62K 21/16
[52] U.S. Cl. ................................... 74/551.3; 403/191;
   403/209; 411/117; 411/166; 411/402; 411/435
[58] Field of Search ................. 74/551.3, 551.1, 551.7;
   411/116, 131, 117, 119, 123, 124, 126, 127, 129,
   173, 166, 180, 402, 403, 405, 409, 427, 435, 910;
   403/209, 191

[56] References Cited

U.S. PATENT DOCUMENTS

| | | | |
|---|---|---|---|
| 547,724 | 10/1895 | Lane | 411/124 |
| 1,281,369 | 10/1918 | Miller | 411/124 |
| 2,366,061 | 12/1944 | Schwinn | 74/551.3 |
| 3,942,822 | 3/1976 | Lewis | 74/551.3 |
| 4,043,688 | 8/1977 | Humlong | 74/551.1 |
| 4,283,091 | 8/1981 | Enders | 411/116 |

FOREIGN PATENT DOCUMENTS

| | | | |
|---|---|---|---|
| 144730 | 3/1950 | Australia | 74/551.3 |
| 2406704 | 8/1974 | Fed. Rep. of Germany | 411/427 |
| 29376 | 12/1896 | United Kingdom | 74/551.3 |
| 529935 | 2/1940 | United Kingdom | 411/116 |

OTHER PUBLICATIONS

"Adjustabar" advertisement, Bicycling Magazine, Aug. 1981, p. 35.

Primary Examiner—Kenneth Dorner
Assistant Examiner—Anthony W. Raskob, Jr.

[57] ABSTRACT

Disclosed is a quickly-adjustable while-in-motion bicycle handlebar securing device which enables a bicyclist to quickly and easily change the bicycle handlebar position while-in-motion to one resulting in less strain upon his neck.

3 Claims, 9 Drawing Figures

U.S. Patent    Jan. 15, 1985    4,493,225
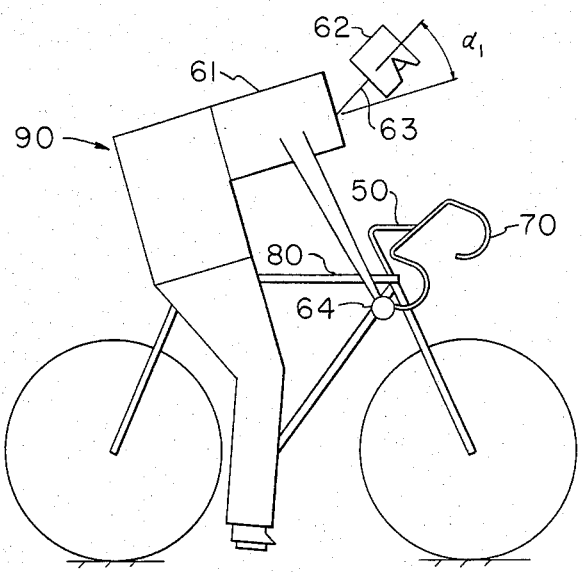
FIG.1
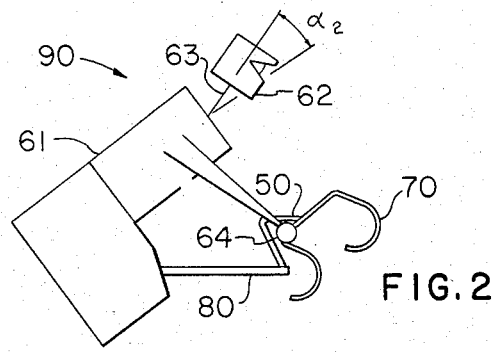
FIG.2
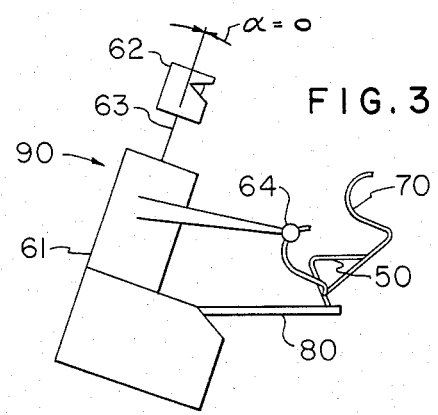
FIG.3
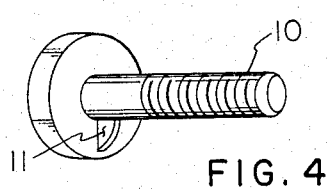
FIG.4
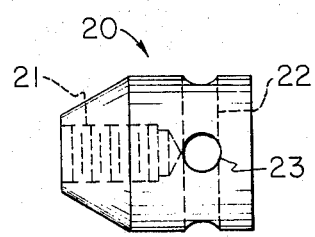
FIG.5
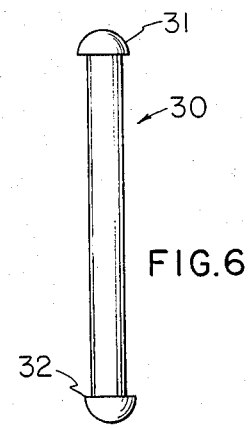
FIG.6
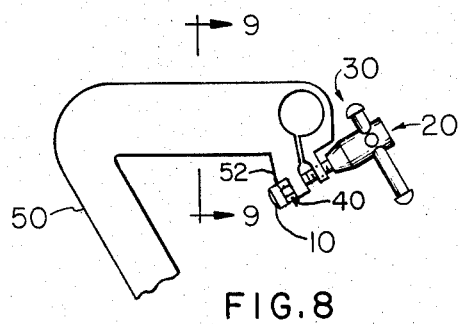
FIG.8
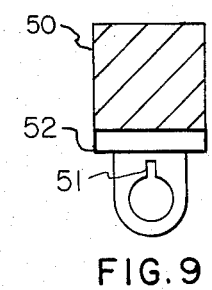
FIG.7
FIG.9

NECK-STRAIN ALLEVIATOR FOR BICYCLISTS

BACKGROUND OF THE INVENTION

1. Field of the Invention

This discovery and invention relate to alleviation of the neck-strain commonly experienced by bicyclists; and more particularly but not by way of limitation, to a quickly-adjustable while-in-motion bicycle handlebar securing device or assembly or apparatus which enables a bicyclist to whenever he desires and circumstances permit to quickly easily change the bicycle handlebar position, to one resulting in less strain upon his neck, while in motion.

2. Description of the Prior Art

Heretofore, a stiff neck was regarded as an inevitable inescapable side-effect of bicycle riding; especially for those who rode the common ten-speed bicycle with dropped-handlebars; particularly for those with such ten-speeds who did a significant amount of racing (which necessitates placing one's hands on the dropped position of the handlebars in order to decrease the wind resistance of the body), and/or a significant amount of hill-climbing (which also necessitates placing one's hands on the dropped position of the handlebars so as to be able to kick in with more leg power going up the hills).

As a bicyclist is riding, the body is in a forward flexed position, particularly when the hands are on the dropped position of the handlebars. This places the burden of support on the muscles of the back and neck and shoulders. This is particularly true of the muscles in the posterior neck since the head, which weighs somewhere in the vicinity of ten pounds, relies entirely on the posterior neck muscles for support when riding with the hands on the dropped position of the handlebars. Holding the head in this position for a long period of time begins to cause muscular imbalance as the posterior muscles become over-contracted causing soreness and a stiff neck.

To the extent, if any, that it may have been realized that it was the dropped position of the hands which was causing the stiff neck, it was stil regarded as inevitable and inescapable since even by placing one's hands upon the crossbar portion of the handlebars, still sooner or later a stiff neck developed.

SUMMARY OF THE INVENTION

Accordingly, it was among the objects of this invention to alleviate bicyclist's stiff neck.

This, among other objects of this invention, is achieved by a quickly-adjustable while-in-motion bicycle handlebar securing device or assembly or apparatus which enables a bicyclist who installs one on his bicycle to whenever he desires while the bicycle is stopped or even while in motion to easily and quickly change the bicycle handlebar position to one resulting in less strain upon his neck, and then when an occasion arises such as racing or hill-climbing which requires the handlebars to be again in a dropped position to quickly and easily change them to that position while in motion; and then back again when desired to the less neck-strainful position, all without dismounting the bicycle.

As a result of much investigation and experimentation, it was surprisingly discovered that by rotating the normal dropped-position ten-speed handlebars to an elevated upside-down position such that the formerly dropped part is now just as much above the crossbar portion of the handlebars as they were formerly below; that now by placing one's hands upon the elevated formerly-dropped part of the handlebars that for essentially all bicyclists the neck is now in such a position that essentially there is no strain at all upon the neck; thus no stiff neck develops so long as the hands and neck are in this new position regardless of how long one rides the bicycle, certainly all day and presumably indefinitely. This is because, as shown in the figures, such a new position not merely diminishes the neck-spine angle as placing one's hands upon the crossbar portion of the handlebars does, but actually essentially eliminates that angle entirely, and thus eliminates the cause of bicyclist's stiff neck.

But there are those times when the handlebars need to be in the dropped position, such as racing, and most particularly when hill-climbing. It is substantially impossible or at least inordinately difficult to ride a normal ten-speed bicycle up a long hill of any appreciable slope without having the handlebars in the dropped position so that one can kick in with more leg power from that position. With the securing means heretofore found on most ten-speed bicycles, the only way of changing the position of the handlebars was to dismount, get out one's wrench if one brought one, loosen the nut which was holding the handlebars tight, rotate the handlebars to a new position, retighten the nut with the wrench, put the wrench away, and remount the bicycle. Necessarily, this procedure is cumbersome, time-consuming, and mood-altering. So it is not likely many bicyclists would take the trouble to go through it every time they went into or came off of a hill; preferring rather to endure the stiff neck rather than repeatedly have to disrupt the pace and mood of a pleasant outing on the bicycle.

Nor is it likely that bicyclists would rid themselves of their current bicycle merely in order to get one that would have the facility of handlebars that were quickly-adjustable while-in-motion to a position of less neck-strain whenever desired. So what was needed was a device that could replace the current securing means normally found on ten-speed bicycles, at minimal expense.

This object was achieved with the device of the present invention, which is adapted to replace the current bolt and nut found on most of the ten-speed bicycles currently in use, and thus extend to most of the ten-speed bicycles currently in use the facility of a quickly-adjustable while-in-motion bicycle handlebar such that whenever desired a bicyclist can quickly and easily while in motion change into and out of a bicycle handlebar position which places less or no strain at all upon his neck.

The device of the present invention is for use to alleviate neck strain of bicyclists by providing hand-adjustability of bicycle handlebar position to bicycle handlebars within a handlebar cavity of a bicycle handlebar stem, the handlebar cavity securing the bicycle handlebars against movement when a bolt within a bolt cavity of the stem is tightened, the device being for use both with a stem having a slot within the bolt cavity of the stem, the slot adapted to engage a fin of a bolt having such a fin, the slot and the fin cooperatively interacting to prevent rotation of the bolt, and with a stem having a ledge, the ledge adapted to abut polygonal-head means of a bolt having such polygonal-head means, when the bolt is positioned within the bolt cavity of the stem, the ledge and the polygonal-head means cooperatively interacting to prevent rotation of the bolt.

The device comprises: a finned threaded bolt, having a fin, the fin adapted to engage a slot within the bolt cavity of a stem having such a slot, when said finned threaded bolt is positioned within the bolt cavity, the slot and the fin cooperatively interacting to prevent rotation of the bolt; a polygonal-sided slotted collar, having an interior slot, the interior slot adapted to engage the fin of said finned threaded bolt when said collar is positioned upon said finned threaded bolt thereby rendering said collar non-rotatable relative to said finned threaded bolt, the polygonal sides of said collar then serving as polygonal-head means for said finned threaded bolt, the polygonal-head means adapted to abut a ledge of a stem having such a ledge, the ledge and the polygonal-head means of said collar cooperatively interacting to prevent rotation of said finned threaded bolt, said collar not being used with a stem not having a ledge; a handle-support, having therein means adapted to engage a handle, and having therein a threaded cavity corresponding to said finned threaded bolt, said handle-support adapted to be threaded onto a protruding threaded end of said finned threaded bolt when said finned threaded bolt is positioned within the bolt cavity of the stem; and a handle, engaged by said handle-support, adapted to when turned to transmit sufficient force to said handle-support when said handle-support is threaded onto said finned threaded bolt positioned within the bolt cavity of the stem, so as to thereby tighten or loosen said finned threaded bolt and thus thereby to tighten or loosen bicycle handlebars within the handlebar cavity of the stem.

BRIEF DESCRIPTION OF THE DRAWINGS

FIG. 1 is a schematic sketch of a bicyclist aboard a common ten-speed bicycle with his hands on the dropped portion of the handlebars, and showing the angle $\alpha$, made by the neck with the torso when the hands are in this position;

FIG. 2 is a schematic sketch of a bicyclist aboard the bicycle with his hands on the crossbar portion of the bicycle handlebars, showing the angle $\alpha_2$ still made by the neck with the torso when the hands are in this position;

FIG. 3 is a schematic sketch of a bicyclist aboard the bicycle with his hands on the elevated (formerly-dropped) portion of the handlebars, showing that the angle $\alpha_3$ between his neck and his torso is now essentially zero;

FIG. 4 is a schematic sketch of a commonly found bicycle handlebar tightening bolt showing the fin which secures it in place within the slot within the cavity of the handlebar stem shown in FIG. 9 to keep it from rotating when in functional position, which as modified is the first component of the present invention;

FIG. 5 is a schematic sketch of the second component of the present invention, replacing the nut which commonly tightens the handlebars in place with the handlebar stem by screwing onto the bolt of FIG. 4, having an internal threaded cavity which corresponds to the threading of the bolt of FIG. 4, and at right angles to the longitudinal axis of the threaded cavity two holes all the way through this handle-support at right angles to each other, adapted to receive and support the handle of FIG. 6;

FIG. 6 is a schematic sketch of a rod which serves as the handle to be inserted into one set of the holes of the handle-support of FIG. 5, being retained from falling through completely the holes by elastomeric caps 31 and 32 on both ends, which serves as the third component of the present invention;

FIG. 7 is a schematic sketch of the fourth component of the present invention, a modified hex-nut type spacer collar with a slot adapted to fit over the fin of the bolt of FIG. 4 to cover it and present a flush surface on the opposite side of the spacer for those types of handlebar securing means which do not have the slot of FIG. 9 to restrain the bolt of FIG. 4 against rotation when in functional position but rather utilize the ledge of FIG. 9 to restrain the bolt against rotation, one of the hex, or other polygonal-sided, edges of this component serving to abut against this ledge and thus prevent rotation of the bolt in functional position for the device of the present invention in applications where the slot of FIG. 9 is not present;

FIG. 8 is a schematic sketch of the device of the present invention in use on a commonly encountered type of bicycle handlebar securing means, a bicycle handlebar stem; and FIG. 9 is a schematic sketch of the section of the handlebar stem of FIG. 8 taken as indicated in FIG. 8, showing the slot commonly found in the cavity of handlebar stems which receives the bolt of FIG. 4, and the ledge which prevents rotation of the bolt in stems which do not have the slot.

DESCRIPTION OF THE PREFERRED EMBODIMENT

Referring to the Figures; when a bicyclist 90 sits upon a common ten-speed bicycle 80 with his hands 64 resting upon handlebars 70, his torso 61 makes an angle $\alpha$ with his neck 63 which supports his head 62. With his hands in the dropped position of the handlebars as shown in FIG. 1, angle $\alpha_1$ is made, a large angle leading to neck strain and a stiff neck very quickly. When his hands are on the handlebar crossbar portion as shown in FIG. 2, the angle made is $\alpha_2$, still a somewhat large angle which rapidly also leads to neck strain and a stiff neck. But when he places his hands on an elevated (formerly-dropped) portion of the handlebars as shown in FIG. 3, made possible quickly and easily while-in-motion by the prevent invention, the angled $\alpha_3$ which results is essentially zero, and thus no neck-strain and stiff neck develop.

As shown in FIG. 8, the device of the present invention, comprising first component 10, second component 20, and third component 30, is attached to a bicycle handlebar stem 50 such that bolt 10 is fitted through the bolt cavity normally present in such stems, handle-support 20 is threaded onto bolt 10 on the other side, and handle 30 is turned to tighten support 20 on bolt 10.

A bicyclist reaches over the handlebars while the bicycle is in motion and grasps and turns handle 30 to loosen the handlebars and move them to a new position, and then retighten them by turning handle 30 in the opposite direction.

Fin 11 is secured in slot 51 to keep bolt 10 from rotating while in functional position. For stems which do not have a slot 51, fourth component 40 is placed over bolt 10 with slot 41 covering fin 11 and hex edge 42 abutting against ledge 52 to prevent bolt 10 from rotating. Alternatively, bolt 10 can be provided with a hex head, and fin 11 covered with a modified lock washer in applications requiring the use of the hex head to keep the bolt from rotating.

What is claimed is:

1. A device for use to alleviate neck strain of bicyclists by providing hand-adjustability of bicycle handlebar position to bicycle handlebars within a handlebar cavity of a bicycle handlebar stem, the handlebar cavity securing the bicycle handlebars against mmovement when a bolt within a bolt cavity of the stem is tightened, the device being for use both with a stem having a slot within the bolt cavity of the stem, the slot adapted to engage a fin of a bolt, the slot and the fin cooperatively interacting to prevent rotation of the bolt, and with a stem having a ledge, the ledge adapted to abut polygonal-head means of a bolt when the bolt is positioned within the bolt cavity of the stem, the ledge and the polygonal-head means cooperatively interacting to prevent rotation of the bolt;

the device comprising:

a finned threaded bolt, having a head and shank portion, and a fin, said fin attached to and extending between said head and shank portions, the fin engaging said slot within the bolt cavity of a stem when said finned threaded bolt is positioned within the bolt cavity, the slot and the fin cooperatively interacting to prevent rotation of the bolt;

a polygonal-sided slotted collar, having an interior slot, the interior slot engaging the fin of said finned threaded bolt when said collar is positioned upon said finned threaded bolt, thereby rendering said collar non-rotatable relative to said finned threaded bolt, the polygonal sides of said collar then serving as polygonal-head means for said finned threaded bolt, the polygonal-head means adapted to abut said ledge of a stem, when said finned threaded bolt is positioned within the bolt cavity of the stem, the ledge and the polygonal-head means of said collar then cooperatively interacting to prevent rotation of said finned threaded bolt;

a handle-support, having therein means adapted to engage a handle, and having therein a threaded cavity receiving said finned threaded bolt, said handle-support threaded onto a protruding threaded end of said finned threaded bolt when said finned threaded bolt is positioned within the bolt cavity of the stem; and a handle, engaged by said handle-support, adapted, when turned to transmit sufficient force to said handle-support when said handle-support is threaded onto said finned threaded bolt positioned within the bolt cavity of the stem, so as to thereby tighten or loosen said finned threaded bolt and thus thereby to tighten or loosen bicycle handlebars within the handlebar cavity of the stem.

2. In combination, the device of claim 1 and a bicycle handlebar stem upon which said device is mounted.

3. In combination, the device of claim 2 and a bicycle on which said device is mounted.

* * * * *